July 9, 1968 J. NOVÁK ET AL 3,392,339

ELECTRIC AMPLIFIERS WITH A NON-LINEAR DIELECTRIC ELEMENT

Filed June 30, 1964 3 Sheets-Sheet 1

INVENTOR.
JIRI NOVAK, EDVARD RECHZIEGEL and ZDENEK VOJTA
BY
Attorney

ELECTRIC AMPLIFIERS WITH A NON-LINEAR DIELECTRIC ELEMENT

Filed June 30, 1964 3 Sheets-Sheet 2

INVENTOR.
JIRI NOVAK, EDVARD RECHZIEGEL and ZDENEK VOJTA
BY
Attorney

ELECTRIC AMPLIFIERS WITH A NON-LINEAR DIELECTRIC ELEMENT

Filed June 30, 1964 3 Sheets-Sheet 3

INVENTOR.
JIRI NOVAK, EDVARD RECHZIEGEL and ZDENEK VOJTA
BY
Attorney

United States Patent Office 3,392,339

Patented July 9, 1968

3,392,339

ELECTRIC AMPLIFIERS WITH A NON-LINEAR DIELECTRIC ELEMENT

Jiří Novák, Edvard Rechziegel, and Zdeněk Vojta, Prague, Czechoslovakia, assignor to Ceskoslovenska Akademie VED, Prague, Czechoslovakia, a corporation of Czechoslovakia Filed June 30, 1964, Ser. No. 379,267
Claims priority, application Czechoslovakia, July 10, 1963, 3,985/63, 3,986/63, 3,987/63, 3,988/63
5 Claims. (Cl. 330—7)

ABSTRACT OF THE DISCLOSURE

An electric amplifier with a non-linear dielectric element is maintained in a temperature autostabilized state above its Curie point by heating by a high frequency source and advantage is taken of different distortion of the applied signal due to changes of voltage of said signal, thus producing distinct even or odd harmonic frequencies of the fundamental frequency. This phenomenon is applied to determine the polarity of the signal voltage.

Figure 1:
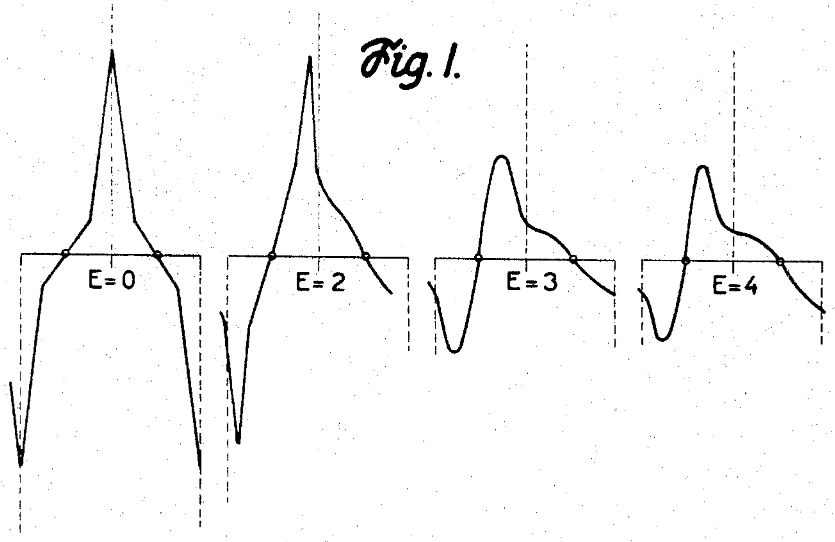

This invention relates to an electric amplifier for direct-curent as well as low frequency alternating voltage range. The main advantage of this amplifier is its zero-level stability, minute noise, high sensitivity and high input resistance. Under certain circumstances the output of the amplifier according to the invention can follow the polarity of the input voltage.

In known amplifiers a great sensitivity and simultaneously a long-termed zero-level stability is achieved with great difficulties only, e.g. in the case of direct-current amplifiers by mechanical commutation of the input voltage etc. All solutions adopted up to now are relatively complicated and do not solve the problem of long-termed reliability even when imposing certain restrictions as for example a narrow range of the input voltage.

These disadvantages are removed by the amplifier according to this invention. The substantial part of this amplifier is represented by an on-linear dielectric element heated by means of a high-frequency generator to the self-stabilized state around its Curie-point and forming the dielectric of a capacitor. These operating conditions together with potential further provisions ensure the temperature stability of the non-linear capacitor and, therefore, the zero-level stability of the amplifier. Owing to the fact that the phenomena causing the non-linearity of the capacitor are not of electronic character, this amplifying element does not represent a source of additional noise.

The self-stabilized point wherein the dielectric is maintained by means of the high frequency supply voltage is characterised by a certain constant temperature of the dielectric of the non-linear capacitors, or capacity respectively. The current corresponding to a sinewave voltage on a capacitor exhibits a cosine waveform. Owing to the fact that in this case the capacity of the non-linear capacitor is maximum during the passage of the voltage sinewave through the zero point, the current cosine curve shows in this very moment an extreme which exceeds the natural maximum of the cosine curve in the same ratio in which the maximum capacity is to the capacity corresponding to the peaks of the high frequency supply voltage sine curve. The distortion of the cosine curve of the high frequency current is caused in this case by odd harmonics. If, however, a direct current bias voltage is added to the HF supply voltage, the HF current wave exhibits a distortion wherein, with increasing DC bias voltage, the even harmonics prevail.

It is an object of the present invention to provide a direct current amplifier exploiting this phenomenon. When a resonance circuit tuned to an even harmonic frequency is connected to the load impedance of the non-linear dielectric element, the oscillating voltage of this resonator increases due to the growing content of harmonic frequencies with the increasing DC bias voltage. This oscillating voltage is than rectified and represents the amplified voltage.

From the accompanying drawings illustrating preferred embodiments of the invention and from the following description the features of the invention will be more clearly apparent.

Figure 4:
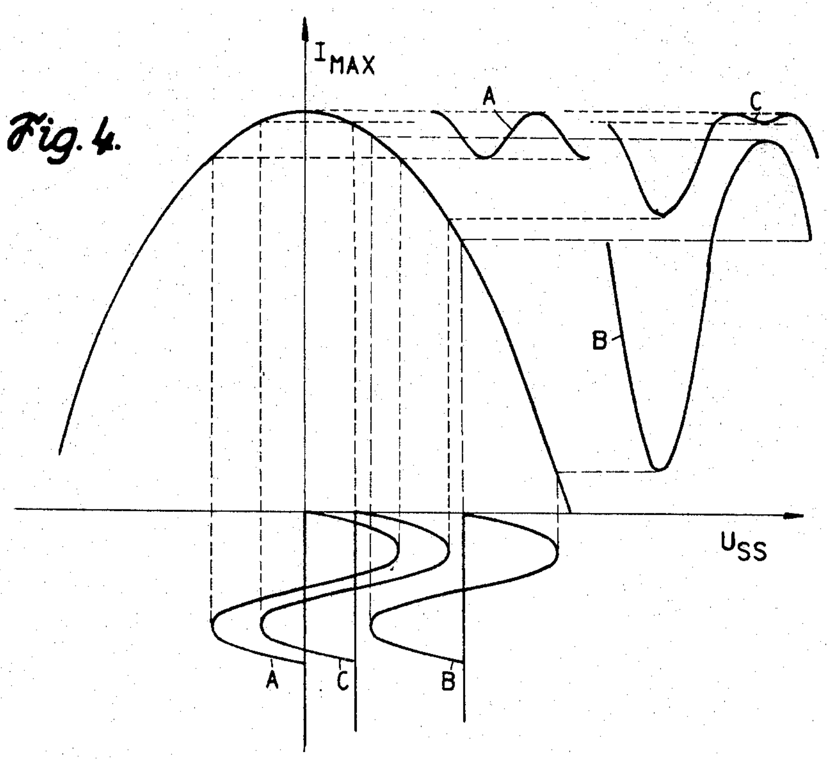
Figure 2:
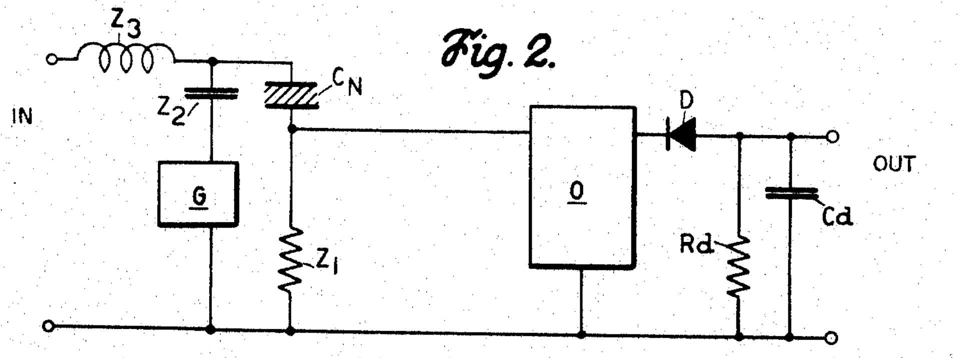
Figure 3:
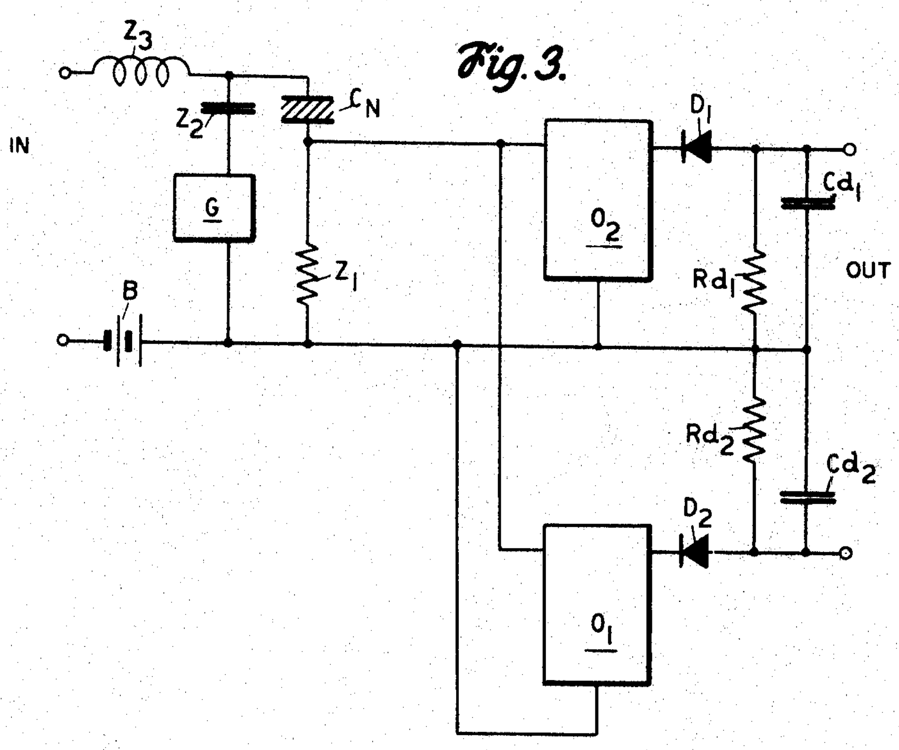
Figure 5:
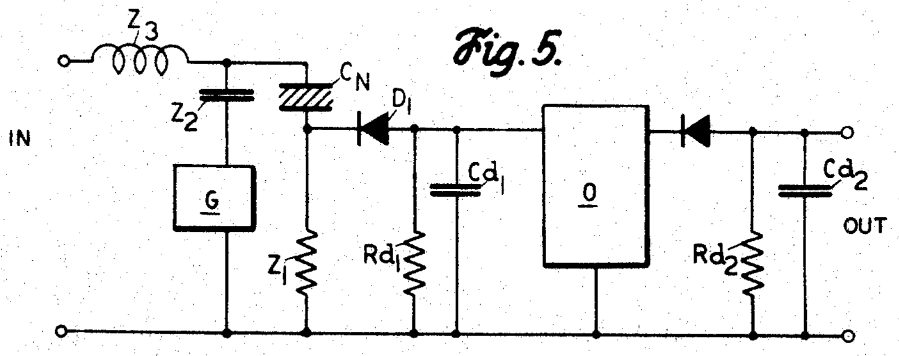
Figure 6:
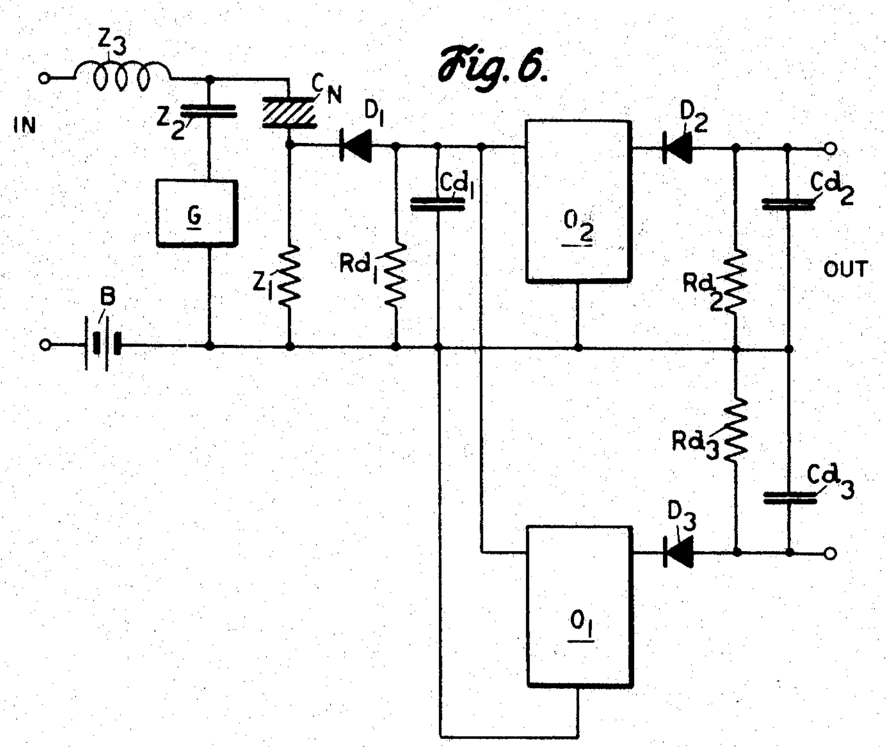

FIG. 1 represents the curves of the HF current of the non-linear capacitor, i.e. in the case of zero and gradually growing DC bias voltage, FIG. 2 illustrates diagrammatically a simple amplifier, FIG. 3 is a diagrammatic view of an amplifier containing two resonance circuits and an auxiliary DC source, FIG. 4 explains the shape of the HF current when a low frequency bias voltage is used and FIGS. 5 and 6 represents two further embodiments of an amplifier according to the invention.

According to FIG. 1 the distortion of the current cosine curve of the non-linear capacitor is caused by the content of odd harmonic frequencies (curve *a*). With addition of a DC bias voltage the distortion shifts towards the even harmonics (curves *b*, *c*, *d*) and the height of the peak diminishes.

In the amplifier illustrated in FIG. 2 the series combination of a non-linear capacitor $C_N$ and a loading impedance $Z_1$ is connected across isolating impedance $Z_2$ to the HF heating generator G. This generator maintains the non-linear capacitor in the self-stabilized state. The input voltage is supplied to the elements $C_NZ_1$ through a blocking impedance $Z_3$ preventing the penetration of the HF supply voltage from the generator G into the input circuit. The isolating impedance $Z_2$ prevents the current of the input source (not shown) to flow across the inner resistance of the HF generator G. The voltage appearing on the loading impedance $Z_1$ represents the voltage equivalent of the HF current distorted, in absence of the DC input voltage, by the odd harmonics. A series or parallel connected resonator circuit 0 tuned to an even harmonic frequency is connected across the loading impedance $Z_1$. When the DC input voltage increases, the content of the even harmonics causes an increase in the oscillating voltage of the resonator 0. This voltage is rectified by means of the detector D and the amplified voltage appears on the parallel loading circuit $R_dC_d$.

This amplifier has, however, the disadvantage that the output voltage does not follow the polarity of the input voltage.

According to a further embodiment of the invention this disadvantage is obviated by the amplifier illustrated in FIG. 3 wherein two resonator circuits $O_1$ and $O_2$ are connected across the loading impedance $Z_1$ the latter being series-connected to the non-linear capacitor $C_N$. One of these resonators is tuned to an odd harmonic and the other is tuned to an even harmonic frequency of the HF voltage. Oscillating voltages of the resonance circuits are rectified in the detectors $D_1$ and $D_2$ and the DC voltages appearing across the loading circuits $Rd_1Cd_1$, $Rd_2Cd_2$ are subtracted. The auxiliary source B connected to the input circuit delivers a DC bias voltage of such magnitude that in absence of the input voltage the oscillating voltages of both resonance circuits are equal, i.e. the output voltage is zero.

The band-width of these amplifiers is limited by physical properties of the dielectric of the non-linear capacitor forming the basic element of the amplifier. With the supply voltage frequencies of hundreds kHz. limiting the operating range of the amplifiers the HF supply current is distorted and exhibits current peaks the amplitude of which is the greatest with a zero direct-current bias voltage. When a DC bias voltage is superimposed on to the HF supply voltage and this bias voltage is gradually increased, the current peak amplitudes decrease and shift their phase. With zero DC bias the distortion of the current cosine curve is caused by odd harmonics whereas with the increasing DC bias the even harmonic distortion takes place. The ratio of the total harmonic content to the fundamental frequency of the supply voltage from the generator decreases with the increase of the fundamental frequency. From what has been described above only one feature remains unaltered, i.e. the decrease of the current amplitude with increasing bias voltage. FIG. 4 illustrates the shape of the maximum HF current values in dependance on the DC bias. The substantially parabolic curve in FIG. 4 represents the envelope of the response to the load impedance $Z_1$ connected in series with the non-linear capacitor $C_N$ in case different bias is applied; it is the envelope of the peaks shown also in FIG. 1 for a different bias voltage. If to the high frequency source G a substantially lower frequency is superimposed the conditions indicated in FIG. 4 may be vitalized. The superimposed low frequency together with no D.C. bias shows on the load impedance $Z_1$ as a double frequency (see curves A, A'), and in case of an increasing D.C. bias voltage the double frequency changes back to the original frequency of the HF heating source (curves B', C'). When the bias voltage now changes e.g. sinusoidally with a frequency always lower than that of the HF supply voltage (in the following description this AC bias frequency is referred to as low-frequency modulation voltage), the frequency of the modulated current response (curve A of FIG. 4) will be doubled and the doubled modulating frequency appears on the modulation envelope of the HF supply supply current. If, furthermore, the HF supply voltage with the superimposed LF modulating component is complemented by a direct-current bias voltage of appropriate magnitude, the modulated current exhibits the form illustrated in FIG. 4B. In this case the frequency doubling does not occur. We can, therefore, consider said DC bias voltage as the input voltage of the amplifier and register the frequency change of the modulated envelope of the HF current which change represents a measure of the amplied DC voltage.

The schematic diagram of an amplifier based on this principle is illustrated in FIG. 5. As in the preceding examples the series combination of the non-linear capacitor $C_N$ and the loading impedance $Z_1$ is connected through the isolating impedance $Z_2$ to the supply voltage generator G. The HF supply voltage maintaining the capacitor in the self stabilized state is superimposed by an LF modulating voltage. The input DC voltage is fed to the elements $C_NZ_1$ through the blocking impedance $Z_3$ preventing the HF voltage from penetrating into the input circuit. The isolating impedance $Z_2$ prevents the input current from the DC source to flow across the inner resistance of the generator G supplying both superimposed alternating voltages. The voltage appearing on the impedance $Z_1$ represents the voltage image of the HF current which is modulated, in absence of the DC input voltage, by the double frequency of the superimposed LF component of the HF supply voltage. When the DC input voltage increases, said current is modulated by a wave with growing content of the fundamental low frequency as shown by C in FIG. 4. The modulation envelope of the HF voltage appearing across the loading impedance $Z_1$ is demodulated by means of the detector $D_1$. To the loading impedance $Rd_1Cd_1$ of the detector $D_1$ a series or parallel resonance circuit O is is connected which is tuned to the fundamental low frequency.

The increase of the oscillating voltage in this resonator appears as direct-current output voltage across the impedance $Rd_2Cd_2$ which is the load impedance of the detector $D_2$.

Owing to the fact that this amplifier is not able to follow the polarity of the input voltage, it is possible to modify its arrangement as shown in FIG. 6. To the load impedance $Rd_1Cd_1$ of the detector $D_1$ which is connected to the impedance $Z_1$ of the non-linear capacitor $C_N$, two parallel or series resonance circuits $O_1$ and $O_2$ are connected.

One of these resonators is tuned to the fundamental of the superimposed low frequency, the second resonator to the second harmonic of this frequency. The oscillating voltages of both resonance circuits are rectified by means of the detectors $D_2$ and $D_3$, and their loading impedance $Rd_2Cd_2$ and $Rd_3Cd_3$ are connected in such a way that the rectified voltages are subtracted. The input circuit contains a constant source B, the magnitude of which is chosen so that in absence of the DC input voltage the oscillating voltages are equal, i.e. the output voltage is zero.

We claim:

1. An amplifier circuit having a pair of input terminals and a pair of output terminals comprising in combination a pair of branch circuits connected across said input terminals, a first isolating impedance connected to one of said input terminals, one of said branch circuits having a non-linear capacitor and a first load impedance connected in series therewith, the other of said branch circuits having a high frequency heating source and a second isolating impedance connected in series therewith, said high frequency heating source heating said non-linear capacitor to an auto-stabilized temperature above its Curie temperature where dielectric losses are in equilibrium with heat dissipation, said first isolating impedance preventing interference of said high frequency heating source on said one of said input terminals, said second isolating impedance preventing currents from said input terminals to short across said high frequency heating source, at least one resonance circuit connected across said first load impedance, and said resonance circuit having a detector means and a third load impedance connected across said output terminals.

2. An electric amplifier defined in claim 1 comprising a single resonance circuit tuned to one harmonic frequency of the high frequency heating source allowing to determine the magnitude of the input signal from the content of said harmonic frequency on the output of said resonance circuit.

3. An electric amplifier defined in claim 1 comprising two resonance circuits of which one is tuned to one of the even harmonic frequencies of the high frequency heating source and the other to one of the odd harmonic frequencies of the high frequency heating source; the load impedances of the corresponding detector means connected so as to have opposite polarity.

4. An electric amplifier defined in claim 1 having one resonance circuit; said high frequency heating source superimposed by a lower frequency; a further detector means with an associated load impedance connected in front of the resonance circuit to the first load impedance associated with the non-linear capacitor; said further detector means demodulating the high frequency heating voltage appearing across the first load impedance associated with the non-linear capacitor, said resonance circuit tuned to said lower superimposed frequency.

5. An electric amplifier defined in claim 1 comprising two resonance circuits of which one is tuned to said superimposed lower frequency and the other to the second harmonic of said superimposed lower frequency, the detector means and load impedances associated with said two resonance circuits connected so as to have opposite polarity.

References Cited

UNITED STATES PATENTS

| | | | |
|---|---|---|---|
| 2,956,234 | 10/1960 | Olsen | 330—7 X |
| 3,101,450 | 8/1963 | Takahashi et al. | 330—7 |
| 3,101,452 | 8/1963 | Holcomb et al. | 330—7 X |

ROY LAKE, *Primary Examiner.*

NATHAN KAUFMAN, *Examiner.*